United States Patent
Cachin et al.

(10) Patent No.: US 9,979,696 B2
(45) Date of Patent: May 22, 2018

(54) SECURITY FRAMEWORK FOR TRANSMITTING COMMUNICATION MESSAGES BETWEEN A SUBSTATION LAN AND PACKET-SWITCHED WAN

(71) Applicant: ABB Technology AG, Zürich (CH)

(72) Inventors: Dominique Cachin, Winterthur (CH); Alex Gygax, Biberstein (CH); Hans-Joerg Maag, Zürich (CH)

(73) Assignee: ABB Schweiz AG, Baden (CH)

( * ) Notice: Subject to any disclaimer, the term of this patent is extended or adjusted under 35 U.S.C. 154(b) by 0 days. days.

(21) Appl. No.: 15/172,939

(22) Filed: Jun. 3, 2016

(65) Prior Publication Data

US 2016/0285829 A1    Sep. 29, 2016

Related U.S. Application Data

(63) Continuation of application No. PCT/EP2014/075688, filed on Nov. 26, 2014.

(30) Foreign Application Priority Data

Dec. 20, 2013    (EP) .................................... 13198956

(51) Int. Cl.
*H04L 29/06*    (2006.01)
*H04L 12/933*    (2013.01)
(Continued)

(52) U.S. Cl.
CPC .......... *H04L 63/0245* (2013.01); *H04L 49/15* (2013.01); *H04L 49/351* (2013.01);
(Continued)

(58) Field of Classification Search
CPC ....... H04L 63/18; H04L 63/16; H04L 63/162; H04L 63/164; H04L 63/166; H04L 63/168
See application file for complete search history.

(56) References Cited

U.S. PATENT DOCUMENTS

2005/0114648 A1 * 5/2005 Akundi ............... H04L 63/0236
                                                                           713/153
2005/0220322 A1 * 10/2005 Olesen .................... H04L 63/12
                                                                           382/100
(Continued)

FOREIGN PATENT DOCUMENTS

EP             2432133 A1       3/2012

OTHER PUBLICATIONS

International Search Report and Written Opinion, PCT/EP2014/075688, dated Mar. 9, 2015, ABB Technology AG, 12 pages.

(Continued)

*Primary Examiner* — Edward Zee
(74) *Attorney, Agent, or Firm* — Taft Stettinius & Hollister LLP

(57) ABSTRACT

The invention relates to the field of a security framework for transmitting communication messages between a Substation LAN and packet-switched WAN, in particular, a network interface for transmitting protection data in a power network. The present invention provides a network interface for transmitting communication data including protection data of a power communication network, between a Substation Ethernet LAN and a packet-switched WAN usually in Layer 2. The network interface comprises: a firewall and a Layer 3 router being connected with each other and adapted to transmit the communication data excluding the protection data; and a Layer 2 bypass being in parallel with the firewall and the Layer 3 router, and adapted to transmit the protection data. According to a further aspect, the present invention also provides a method for transmitting such communication data.

6 Claims, 1 Drawing Sheet

(51) Int. Cl.
*H04L 12/931* (2013.01)
*H04L 12/721* (2013.01)
*H02H 1/00* (2006.01)
*H02H 7/26* (2006.01)

(52) U.S. Cl.
CPC ............ *H04L 63/02* (2013.01); *H04L 63/162* (2013.01); *H04L 63/164* (2013.01); *H04L 63/18* (2013.01); *H02H 1/0061* (2013.01); *H02H 7/261* (2013.01); *H04L 45/66* (2013.01); *Y04S 40/24* (2013.01)

(56) References Cited

U.S. PATENT DOCUMENTS

2011/0307114 A1 12/2011 Kunsman et al.
2012/0233296 A1 9/2012 Wimmer

OTHER PUBLICATIONS

European Search Report, EP13198956.8, dated Apr. 14, 2014, ABB Technology AG, 6 pages.

* cited by examiner

SECURITY FRAMEWORK FOR TRANSMITTING COMMUNICATION MESSAGES BETWEEN A SUBSTATION LAN AND PACKET-SWITCHED WAN

FIELD OF THE INVENTION

The invention relates to the field of a security framework for transmitting communication messages between a Substation LAN and packet-switched WAN, in particular, a network interface for transmitting protection data in a power network.

BACKGROUND OF THE INVENTION

IEC6850-90-1 describes two approaches in order to transmit data of critical protection services over wide area networks WAN. The tunneling approach assumes that the Ethernet packets containing the protection data are transmit in wire speed, in their native Ethernet format and without or with only minor changes to the packets. This approach is suitable for binary distance protection data typically coded as GOOSE messages in IEC68150, as well as for differential protection data coded as sampled values SV.

EP-2-432-133-A describes extended functionality to the GOOSE tunneling approach as described in the technical paper IEC6850-90-1, which includes: event recorder/command counter for configurable binary events in the tunneled GOOSE messages, and constant supervision of a communication channel between two communication edge devices of the service and notification of the connected service end devices in case the channel quality does not meet the requirements for reliable communication.

US 2012/0233296 describes a gateway intelligent electronic device IED for a Substation Automation SA system, where the gateway IED comprises a communication interface configured to communicate according to IEC 61850, and it can provide via a substation communication network a routing function with firewall and access control for direct access to the concerned protection IEDs.

US 2005/0114648 relates the field of information technology in general and describes an implementation of a dual mode firewall that acts as a bridge for Layer 2 traffic and acts as a router for Layer 3 traffic. Accordingly, the network devices can provide both the transparent forwarding of Layer 2 traffic and Layer 3 routing capabilities, as well as the implementation of security policies at Layer 2 or 3.

US 2011/307114 in reference to the standard describes for time-critical event-based messages, i.e. IEC 61850-8-1, specifies the GOOSE directly on the Ethernet link Layer of the communication stack. For very fast periodically changing signals at the process level such as measured analogue voltages or currents IEC 61850-9-2 specifies the Sampled Value SV service. Next to the functional shortcomings of the current approaches, there also technical challenges currently not solved by the tunneling approach.

According to the current version of the standard IEC61850, Edition 2, the GOOSE and SV messages are plain OSI Layer 2 Ethernet Messages without Layer 3 IP extension.

This stands in contrast to the typical design of Ethernet based communication infrastructure in utility applications, where the interface between a Layer 2 substation LAN and wide area communication network is always a Layer 3 router and a firewall operating on Layer 3 IP, see FIG. 1. Architecture of the WAN is manifold. Today Layer 2 Ethernet implemented on physical SDH technology is the typical case. In future, MPLS networks, also called Layer 2.5 networks are expected to take the dominant role. Note that also MPLS is a Layer below IP and therefore not IP aware.

The combination of router and firewall is a preferred interface solution from a security aspect as well as from traffic scaling perspective. The router can be configured such that only traffic intended for inter substation communication is transmit to the WAN. However, from performance perspective, Layer 3 switching or routing which is considerably slower than Layer 2 operations, is sufficient for the Ethernet based applications currently found in substations, i.e. Voice over IP, SCADA traffic according to IEC60870-5-104 or Modbus protocol or office IT services provided to the substations.

For IEC61850 based protection services, GOOSE and SV, the architecture as indicated in FIG. 1 has some limitations, e.g. the Layer 2 services without IP extensions are not able to pass the Layer 3 router, the performance of the Layer 3 switching or routing is considered as not sufficient fast in order to meet the tight timing constraints of protection services that is typically 4 to 10 ms end to end, and routing of Layer 2 messages in a packet switched WAN needs special attention.

DESCRIPTION OF THE INVENTION

As described above the current approach does not enables a fast and at same secure transmission of the protection data such as GOOSE and SV messages between a Substation Ethernet LAN and a packet-switched WAN.

Just replacing the Layer 3 Router as typical interface between Substation LAN and WAN by a Layer 2 switch does not solve the problem ether. Problems that may occur with this approach would be:

In view of security, a Layer 2 interface between a WAN and a substation LAN would give full and unprotected/uncontrolled access to a substation from the outside world.

In view of scalability, the entire multicast and broadcast traffic of all substations connected to the WAN would be flooded over the entire network, i.e. the entire WAN and all substation LANs.

In view of routing, there are no means to control the traffic flows of neither uni-, nor multi- or broadcast traffic in the WAN. Thus, over time by MAC learning, unicast would find one appropriate way through the WAN, uni- and multicast traffic from any substation would constantly be transmit all over the entire network.

It is therefore an objective of the invention to provide a secure framework for transmission of protection data between two Substation LANs over a packet-switched WAN. The framework should include components for transmission of the Layer 3 communication data as well as for transmission of protection data, which enables a fast and secure transmission of the protection data and at the same time avoids impacts to the unicast traffic through the Layer 3 router and firewall by flooding of the protection data over the entire network. This objective is achieved by a method and a device according to the independent claims. Preferred embodiments are evident from the dependent patent claims.

The present invention provides a network interface, between a Substation Ethernet LAN and a packet-switched WAN usually in Layer 2, for transmitting communication data including protection data of a power communication network. The network interface comprises: a firewall and a Layer 3 router being connected with each other and adapted to transmit the communication data excluding the protection data; and a Layer 2 bypass being in parallel with the firewall and the Layer 3 router, and adapted to transmit the protection data.

The protection data are messages of time critical protection services in a power system such as GOOSE messages and SV according to IEC 61850. The term transmitting here includes the meaning of forwarding and exchanging as well as preparing the communication data prior to forwarding. The communication data exclusive of or without protection data relates to the non-GOOSE and non-SV, e.g. data of voice over IP, SCADA traffic or office IT services.

The network interface according to the present invention can further comprise a first communication channel connecting the firewall and the Layer 3 router with the Substation LAN, and a second communication channel connecting the Layer 2 bypass with the Substation LAN. The firewall and the Layer 3 router are adapted to transmit the communication data excluding the protection data via the first communication channel, and the Layer 2 bypass is adapted to transmit the protection data via the second communication channel. The first and second communication channel may be two physically independent and separated cables or lines. This enables separation of protection data transmission using dedicated communication channel.

According to a further aspect, the present invention also provide a method of transmitting communication data including protection data of a power communication network between a Substation Ethernet LAN and a packet-switched WAN. The method comprises the steps of: transmitting the communication data excluding the protection data through a firewall and a Layer 3 router that are connected with each other and arranged between the WAN and the Substation LAN; and transmitting the protection data through a Layer 2 bypass that is in parallel with the firewall and the Layer 3 router and is connected between the WAN and the Substation LAN. Preferably, the network interface comprises a Layer 2 switch arranged between the WAN and the Layer 2 bypass, the firewall and the Layer 3 router. The Layer 2 switch enables that the protection data coming from the Substation LAN is merged together with the other non-protection data through the Layer 3 router and the firewall, towards the packet-switched WAN. In the receiving direction, i.e. from the WAN towards Substation LAN, the Layer 2 switch will separate the non-protection data from the protection data, send the non-time critical Layer 3 IP traffic to the standard firewall and L3 router interface towards the substation whereas the time critical protection services are addressed towards the fast Layer 2 bypass.

In other words, the network interface according to the present invention may have two connection channels with the Substation LAN, i.e. a first one connecting the Layer 2 switch with the Substation LAN via the Layer 2 bypass, while a second one connecting the Substation LAN via the firewall and the Layer 3 router. Thus, the Layer 2 bypass is connected with the Layer 2 switch in parallel with the firewall and the Layer 3 router connecting the Layer 2 switch. Such connectivity according to the present invention enables on the one hand a fast transmission of the time-critical messages, i.e. the protection data such as GOOSE and SV, since they are transmitted in a separate Layer 2 bypass between the Substation LAN and the WAN; and on the other hand a secure transmission of the non-time critical communication data via the firewall and the Layer 3 router.

In order to authenticate the protection data, i.e. avoiding unauthorised sending of time-critical messages thereby securing the transmission of the time-critical messages, the Layer 2 bypass may use a digital signature. The authentication is done to make sure only authenticated protection data may enter the substation from the WAN side. This may be used against an attacker in the WAN, which tries to get access to a Substation LAN. In the other direction, i.e. from the Substation LAN to the WAN, a filtering function is applied to make sure only GOOSE and SV with configured address and identification fields may pass. In this direction, the traffic that passes from substation to WAN can be then authenticated with a signature which can be used by the receiver to verify the validity before the messages are allowed to enter to the substation LAN.

According to the present invention, when the communication data including time-critical messages are received from the Substation LAN by the Layer 2 bypass in the first communication channel, the time-critical messages can be filtered and transmitted to the Layer 2 switch and the remaining communication data that are non-time critical can be discarded. At the other hand, the communication data can also be received from the Substation LAN by the Layer 3 router in the second communication channel, e.g. in a broadcast manner. The non-time critical messages will be then transmitted through the second channel via the firewall towards the Layer 2 switch. The Layer 3 router can discard the GOOSE and SV messages, since they are Layer 2 messages without Layer 3 information, e.g. IP address. Thus, a Layer 3 router cannot operate on such messages. The default behaviour of a Layer 3 router on non-Layer 3 traffic, i.e. Layer 2 traffic, is to discard it.

The conventional approach may be either (a) encapsulating the time-critical messages into the Layer 3 communication channel in order to secure the transmission but slowing down the same time transmission speed, or (b) replacing the Layer 2 and firewall with a Layer 2 switch which would in particular provide an unsecured and direct Layer 2 Ethernet access to an electrical substation, that may enable an attacker from outside the substation full and unsecured access to the LAN of the electrical substation. Thus, both conventional approaches (a) and (b) have their disadvantages. In comparison, the present invention provides separate transmission channels for the time-critical and non-time critical messages respectively, thereby enabling a secure and fast transmission of the communication data over all.

Further, while some conventional approaches are directed at data communication within one Substation LAN, where typically the entire communication is exclusively Layer 2 Ethernet based, the present invention aims at providing an inter-substation solution, where a Layer 3 router is part of the communication path employed on the border between the substation and the WAN. This inter-substation solution does not yet exist in the current power distribution network.

Preferably, for the communication data from the Substation LAN towards the WAN, the Layer 2 bypass is adapted to filter the protection data from the communication data and the substation internal protection data based on parameter of the protection data such as MAC Address, VLAN ID, APP ID, etc.

Preferably, for the communication data from the Substation LAN towards the WAN, the Layer 2 bypass is adapted to provide authentication information to the protection data such as a digital signature.

Preferably, for the communication data from the Substation LAN towards the WAN, the Layer 2 bypass is adapted to provide the protection data with network routing information such an MPLS in case of MPLS based WAN networks.

Preferably, for the communication data from the WAN towards the Substation LAN, the Layer 2 bypass is adapted to verify the routing information and the digital signature of the protection data.

BRIEF DESCRIPTION OF THE DRAWINGS

The subject matter of the invention will be explained in more detail in the following text with reference to preferred exemplary embodiments which are illustrated in the attached drawings, in which.

The reference symbols used in the drawings, and their primary meanings, are listed in summary form in the list of designations. In principle, identical parts are provided with the same reference symbols in the figures.

DETAILED DESCRIPTION OF PREFERRED EMBODIMENTS

Figure 1:
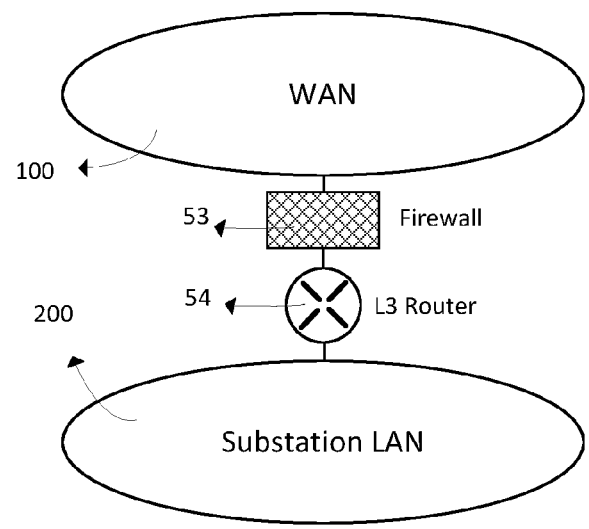
FIG. 1 schematically shows an Ethernet based interface between a Substation LAN and WAN core network.

FIG. 1 shows the connectivity of the Substation Ethernet LAN with a WAN core. As shown all communication data will be transmitted through a WAN edge device including a Layer 3 router or switch and a Firewall. There is no dedicated channel for protection data of time critical protection services, e.g. command for switching of a certain breaker.

Figure 2:
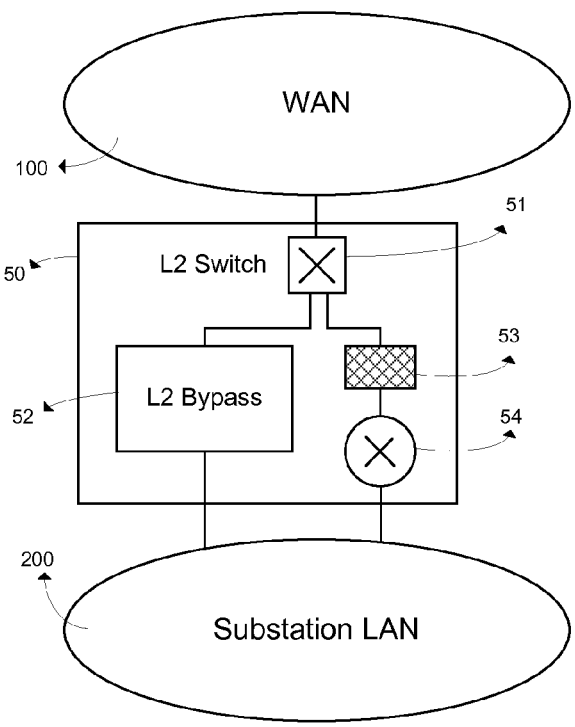
FIG. 2 schematically shows an Ethernet based interface between a Substation LAN and WAN core network according to the present invention.

FIG. 2 shows a dedicated communication channel for transmitting the data of time critical protection services. This enables a fast transmission of protection data through the Layer 2 bypass 52. The protection data may be also digitally signed in order to improve the security of the transmission of the protection data of the power networks.

With the present invention, a combination of L3 router 54, firewall 53 and L2 switch 51 is proposed as improved solution for an interface between a substation LAN and a WAN. Depending on the traffic, one or the other path will be used for the service providing the improved interface for each service and solving all the problems mentioned before. Moreover, the present invention integrates the Layer 2 switch and a Layer 2 bypass with the existing components such as Layer 3 router and firewall into an edge device of the WAN network.

The non-protection data of the communication data based traffic, i.e. non-GOOSE and non-SV such as Voice over IP, SCADA traffic or office IT services, passes through the L3 router 54 and firewall 53, which basically means that for all traffic currently found in the utility environment nothing changes: traffic is less performance critical, IP based, L3 routing performance is sufficient and by use of router/firewall security requirements are met.

With regard to the protection data, the present invention provides a dedicated channel for transmitting this time and application critical services. The protection data is usually in form of multicast messages that is broadcasted towards the communication network. Hereinafter, the transmission of the protection data will be explained depending on the direction of the transmission:

In Sending Direction—from Substation to LAN Towards WAN:

In this direction, only Layer 2 based protection data according to IEC61850 GOOSE or SV can bypass this default L3 router/Firewall path via a Layer 2 bypass 52.

In order to achieve this, a filtering mechanism inside the communication edge device 50 filters the protection data based on their parameters such as MAC addresses, VLAN ID, Ether-type for GOOSE or SV and/or APP ID.

Further, each packet that is sent to the WAN is digitally signed by the communication device, which provides the authentication of the messages. This guarantees that the sender of the protection data cannot be manipulated, thereby increasing the security of the protection data transmission.

Further, the Layer 2 bypass may also extend the protection data with adequate routing information in order that the protection data be transmitted to the appropriate receivers in the WAN only, e.g. VLAN ID in case of pure Layer 2 core network, MPLS tag in case of MPLS as WAN technology, or IP address in case of Layer 3 IP as WAN technology.

Further, also other functionality can be implemented in this Layer 2 bypass as part of a protection interworking function, e.g. event-recorders or redundancy of transmission paths for the protection data.

In Receiving Direction—from the WAN to the Substations

In this direction, only traffic that is addresses for a particular node is accepted and should be routed to a particular network node. In order to enable this, the Layer 2 bypass verifies the routing information of the protection data and checks the digital signature of the protection data. Thus, only traffic that has been digitally signed by a counterpart on the sending side is accepted and transferred to the substation. This prevents the Layer 2 security hole that otherwise would be the result of the Layer 2 bypass from a WAN to a substation LAN. Moreover, in the receiving direction, also other functionalities according to described in the prior art can be provided by the Layer 2 bypass.

While the invention has been described in detail in the drawings and foregoing description, such description is to be considered illustrative or exemplary and not restrictive. Variations to the disclosed embodiments can be understood and effected by those skilled in the art and practising the claimed invention, from a study of the drawings, the disclosure, and the appended claims. In the claims, the word "comprising" does not exclude other elements or steps, and the indefinite article "a" or "an" does not exclude a plurality. The mere fact that certain elements or steps are recited in distinct claims does not indicate that a combination of these elements or steps cannot be used to advantage, specifically, in addition to the actual claim dependency, any further meaningful claim combination shall be considered disclosed.

LIST OF DESIGNATIONS

100 WAN Core in Layer 2 or 2.5
200 Substation Ethernet LAN in Layer 2
50 Network interface between Substation LAN and WAN
51 Layer 2 switch
52 Layer 2 Bypass
53 Firewall
54 Layer 3 router

The invention claimed is:
1. A network interface for transmitting communication data including protection data of a power communication network between a Substation LAN and a packet-switched WAN, comprising:
 a firewall and a Layer 3 router being connected with each other, and configured to transmit the communication data excluding the protection data via a first communication channel;

a Layer 2 bypass being in parallel with the firewall and the Layer 3 router, and configured to transmit the protection data via a second communication channel; and a Layer 2 switch arranged between the WAN and the Layer 2 bypass, the firewall and the Layer 3 router, wherein the Layer 2 switch is configured to merge or separate the protection data with or from the communication data.

2. The network interface according to claim 1, wherein the Layer 2 bypass is configured to filter the protection data from the communication data based on parameter of the protection data.

3. The network interface according to claim 1, wherein the Layer 2 bypass is configured to authenticate the protection data using a digital signature.

4. The network interface according to claim 1, wherein the Layer 2 bypass is configured to provide the protection data with network routing information.

5. The network interface according to claim 1, wherein the Layer 2 bypass is configured to verify the routing information and the digital signature of the protection data.

6. The network interface according to claim 1, wherein the Layer 2 bypass is configured to filter the protection data from the communication data based on parameter of the protection data; and wherein the Layer 2 bypass is configured to authenticate the protection data using a digital signature.

* * * * *